United States Patent
Kavanagh et al.

[11] Patent Number: 5,878,532
[45] Date of Patent: Mar. 9, 1999

[54] DOOR CARTRIDGE HAVING A DOOR LATCH MOUNTING ASSEMBLY

[75] Inventors: Christopher J. Kavanagh, Fraser; Richard C. Wroblewski, Warren; Robert B. Mooney; D'Arcy Miller, both of Farmington Hills, all of Mich.

[73] Assignee: Atoma International Inc., Markham, Canada

[21] Appl. No.: 89,351

[22] Filed: Jun. 3, 1998

Related U.S. Application Data

[60] Provisional application No. 60/005,057 Sep. 28, 1995.

[62] Division of Ser. No. 719,760, Sep. 25, 1996, Pat. No. 5,802,770.

[51] Int. Cl.⁶ ........................................ E06B 1/00
[52] U.S. Cl. .............................. 49/380; 206/325
[58] Field of Search ........................... 49/380, 502, 503, 49/506; 206/325

[56] References Cited

U.S. PATENT DOCUMENTS

| | | | |
|---|---|---|---|
| 3,767,243 | 10/1973 | Yoshimura | 292/216 |
| 4,052,094 | 10/1977 | Widén | 292/336.3 |
| 4,097,078 | 6/1978 | Tack et al. | 292/216 |
| 4,575,138 | 3/1986 | Nakamura et al. | 292/216 |
| 4,827,671 | 5/1989 | Herringshaw et al. | 49/503 |
| 4,924,630 | 5/1990 | Lomasney et al. | 49/502 |
| 4,949,508 | 8/1990 | Elton | 49/502 |
| 5,308,129 | 5/1994 | Hlavaty | 49/502 X |
| 5,417,470 | 5/1995 | Holt | 296/146.6 X |

*Primary Examiner*—Jerry Redman
*Attorney, Agent, or Firm*—Pillsbury Madison & Sutro LLP

[57] ABSTRACT

A door cartridge assembly is provided to be installed into a vehicle door. The assembly includes a door hardware mounting panel having door components mounted thereon and being constructed and arranged to be fixedly mounted to a vehicle door; coupling structure carried by the mounting panel; and a door latch assembly constructed and arranged to be secured to a vehicle door to provide a latch for the vehicle door. The door latch assembly includes a latching member constructed and arranged to be movable between a latching position and a releasing position. The coupling structure is constructed and arranged to receive the latching member in latching relation therewith when the latching member is in the latching position thereof, thereby permitting the mounting panel to be transported with the door latch assembly connected thereto. The door latch assembly is operable to move the latch member from the latching position to the releasing position permitting the latch assembly to be removed from latching relation with the coupling structure and to be subsequently secured to the vehicle door.

13 Claims, 7 Drawing Sheets

5,878,532

DOOR CARTRIDGE HAVING A DOOR LATCH MOUNTING ASSEMBLY

This is a division of application Ser. No. 08/719,760, filed Sep. 25, 1996, now U.S. Pat. No. 5,802,770.

This application claims the benefit of Provisional Application No. 60/005,057, filed Sep. 28, 1995.

BACKGROUND OF THE INVENTION

The present invention relates to door cartridge assemblies of the type that are to be installed into the door of a motor vehicle and more particularly to the construction of such door cartridge assemblies which (1) facilitates the transportation of the door cartridge assembly from a location where the assemblies are produced to a location where the assemblies are to be installed and (2) facilitates the installation of the assemblies after transportation has been accomplished. The invention also involves a method attaching a door latch mechanism to a door panel defining a door cartridge assembly for transporting as a unit.

Door cartridge assemblies have been provided to ease assembly of a vehicle door. These cartridge assemblies typically include a door hardware mounting panel having various door components mounted thereon, such as an inner door release handle, a window regulator, and a wiring harness. Other hardware components such as a multiplexing computer box, a motor for a power window, an outside door release handle, and a window guide may also be mounted on the panel. The panel is typically shipped to the OEM assembly plant with the door hardware thereon.

Typically, at the OEM assembly plant, the door latch mechanisms and strikers are retrieved from their separate shipping containers and mounted to the vehicle door. To reduce part numbers and part tracking at the shipping source and at the OEM assembly plant and to eliminate the retrieval time of the latch and striker components from their separate shipping containers, a need exists to prove a door cartridge assembly which has temporarily mounted thereon the latch mechanism, and if desired, the cooperating striker.

SUMMARY OF THE INVENTION

It is an object of the present invention to provide a door cartridge assembly to fulfill the need referred to above. In accordance with the principles of the present invention, this objective is obtained by providing a door cartridge assembly to be installed into a vehicle door. The assembly includes a door hardware mounting panel having door components mounted thereon and is constructed and arranged to be fixedly mounted to a vehicle door; coupling structure carried by the mounting panel; and a door latch assembly constructed and arranged to be secured to a vehicle door to provide a latch for the vehicle door. The door latch assembly includes a latching member constructed and arranged to be movable between a latching position and a releasing position.

The coupling structure is constructed and arranged to receive the latching member in latching relation therewith when the latching member is in the latching position thereof, thereby permitting the mounting panel to be transported with the door latch assembly connected thereto. The door latch assembly is operable to move the latch member from the latching position to the releasing position enabling the latch assembly to be removed from latching relation with the coupling structure and to be subsequently secured to the vehicle door.

A method of coupling a door latch assembly to a door mounting panel for shipping as a unit is also provided. The door mounting panel is constructed and arranged to be fixedly mounted to a vehicle door. The door latch assembly includes a latching member constructed and arranged to be movable between a latching position and a releasing position. The method includes providing coupling structure on the mounting panel, and temporarily securing the door latch assembly to the panel by engaging the latching member in the latching position thereof with the coupling structure enabling the mounting panel with the latch assembly coupled thereto to be transported to an assembly location as a unit.

Other objects, features and characteristics of the present invention, as well as the methods of operation and functions of the related elements of the structure, and the combination of the parts and economics of manufacture, will become more apparent upon consideration of the following detailed description and appended claims with reference to the accompanying drawings, all of which form a part of this specification.

BRIEF DESCRIPTION OF THE DRAWINGS

The invention can best be understood from the accompanying drawings wherein.

DETAILED DESCRIPTION OF THE INVENTION

Figure 1:
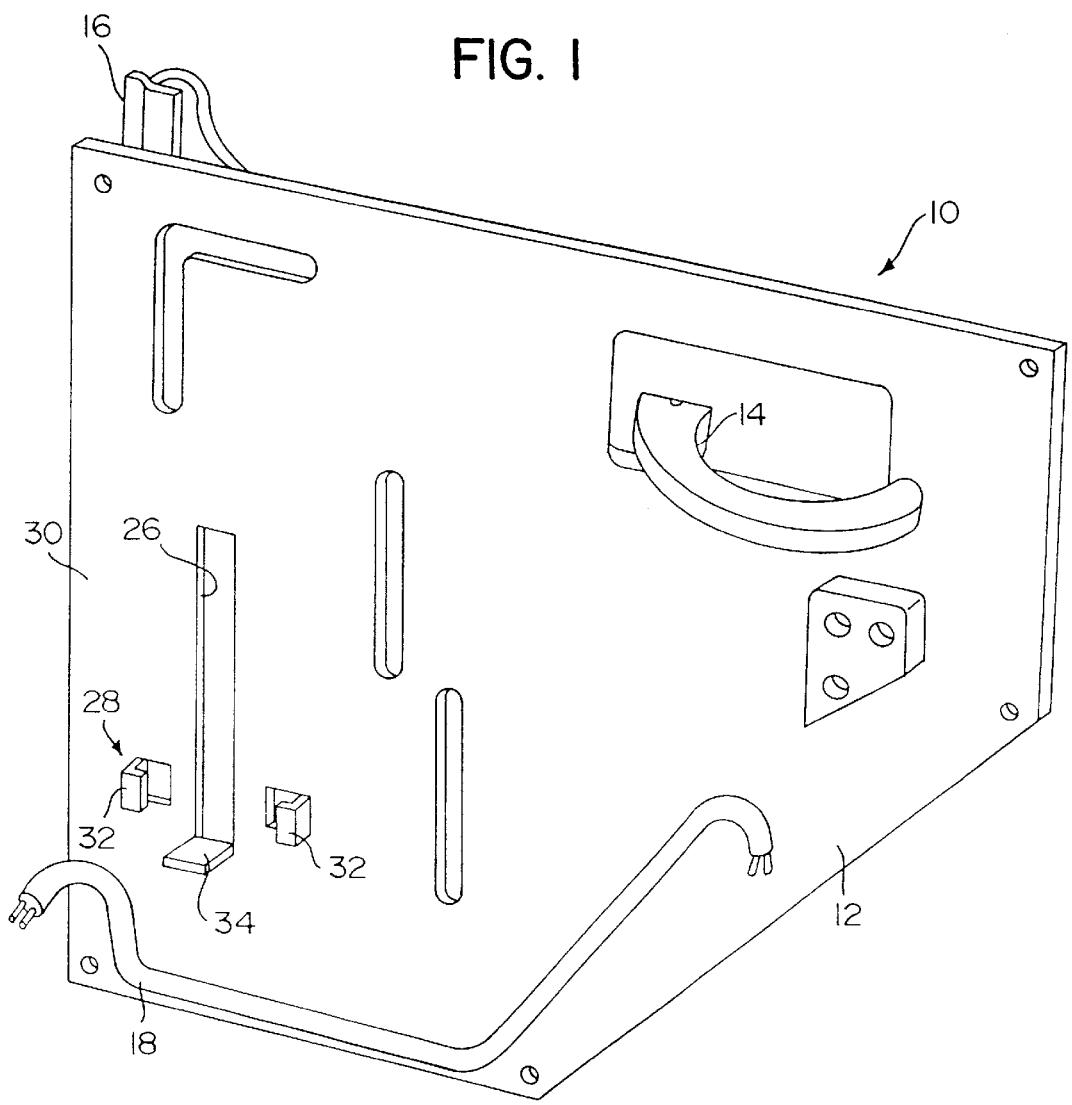
FIG. 1 is a perspective view of a mounting panel constructed in accordance with the principles of the present invention prior to assembling therewith the striker member and door latch assembly components constituting a door cartridge assembly embodying the principles of the present invention.

Referring now more particularly to FIG. 1, there is shown therein a door cartridge assembly, generally indicated at 10, embodying the principles of the present invention. The door cartridge assembly 10 includes a door hardware mounting panel 12, which mounts various door components, such as an inner door release handle 14, a window regulator 16, and a wiring harness 18. It can also be appreciated that the mounting panel can be used to mount other components such as a multiplexing computer box, a motor for a power window, an outside door release handle, and a window guide, which are not shown in the figures. Preferably, the hardware mounting panel 12 is made from steel and formed in a stamping operation in which the panel 12 is stamped simultaneously with an inner door panel as disclosed in copending U.S. patent application Ser. No. 08/515,113, the disclosure of which is hereby incorporated by reference into the present specification. However, in the broadest aspects of the present invention, other mounting panels that are to be installed in the door are contemplated and these panels may be made of plastic and other composite non-ferrous materials.

Figure 2:
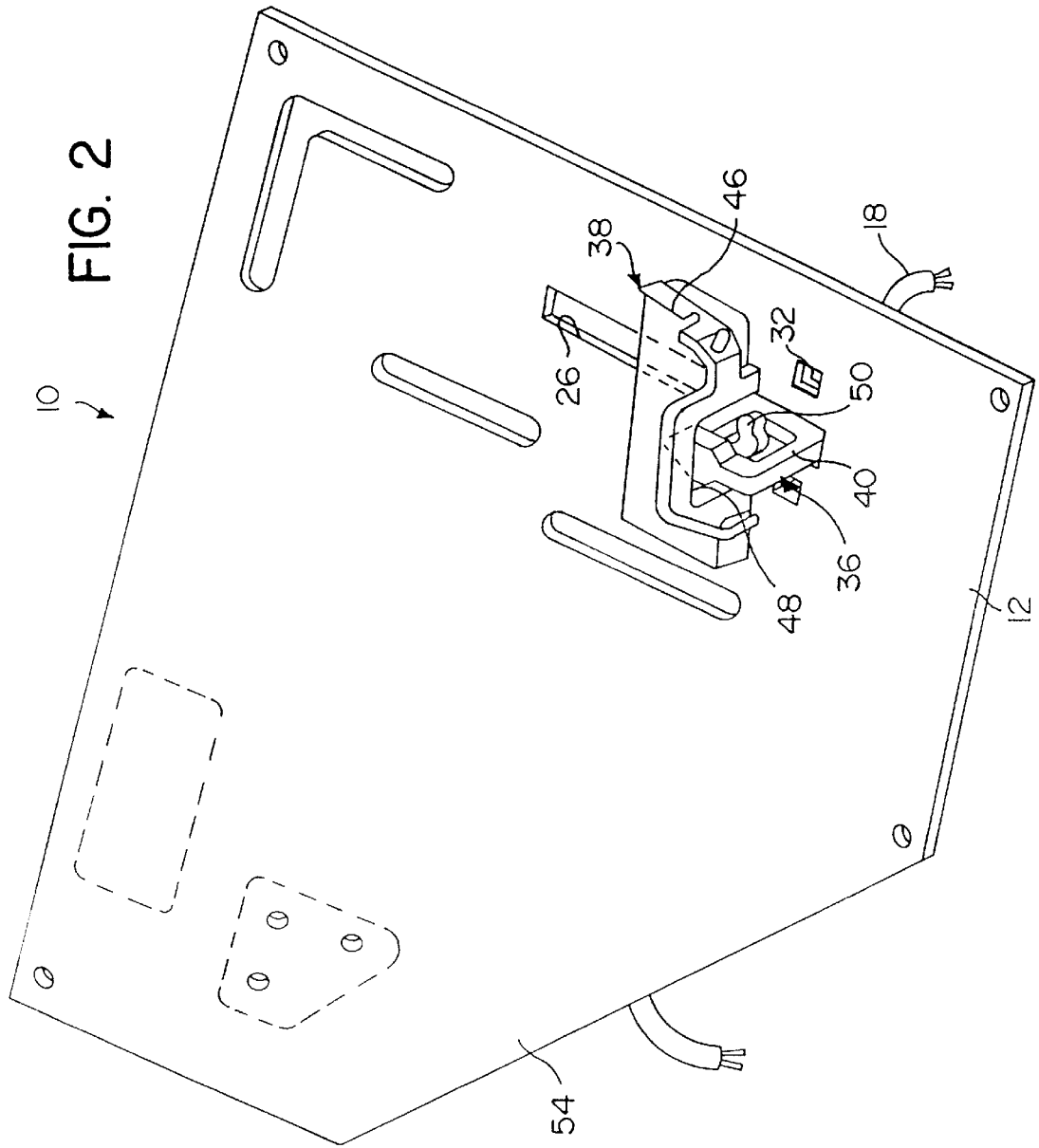
FIG. 2 is a perspective view of the door cartridge assembly embodying the principles of the present invention viewing the same from one side of the mounting panel.
Figure 3:
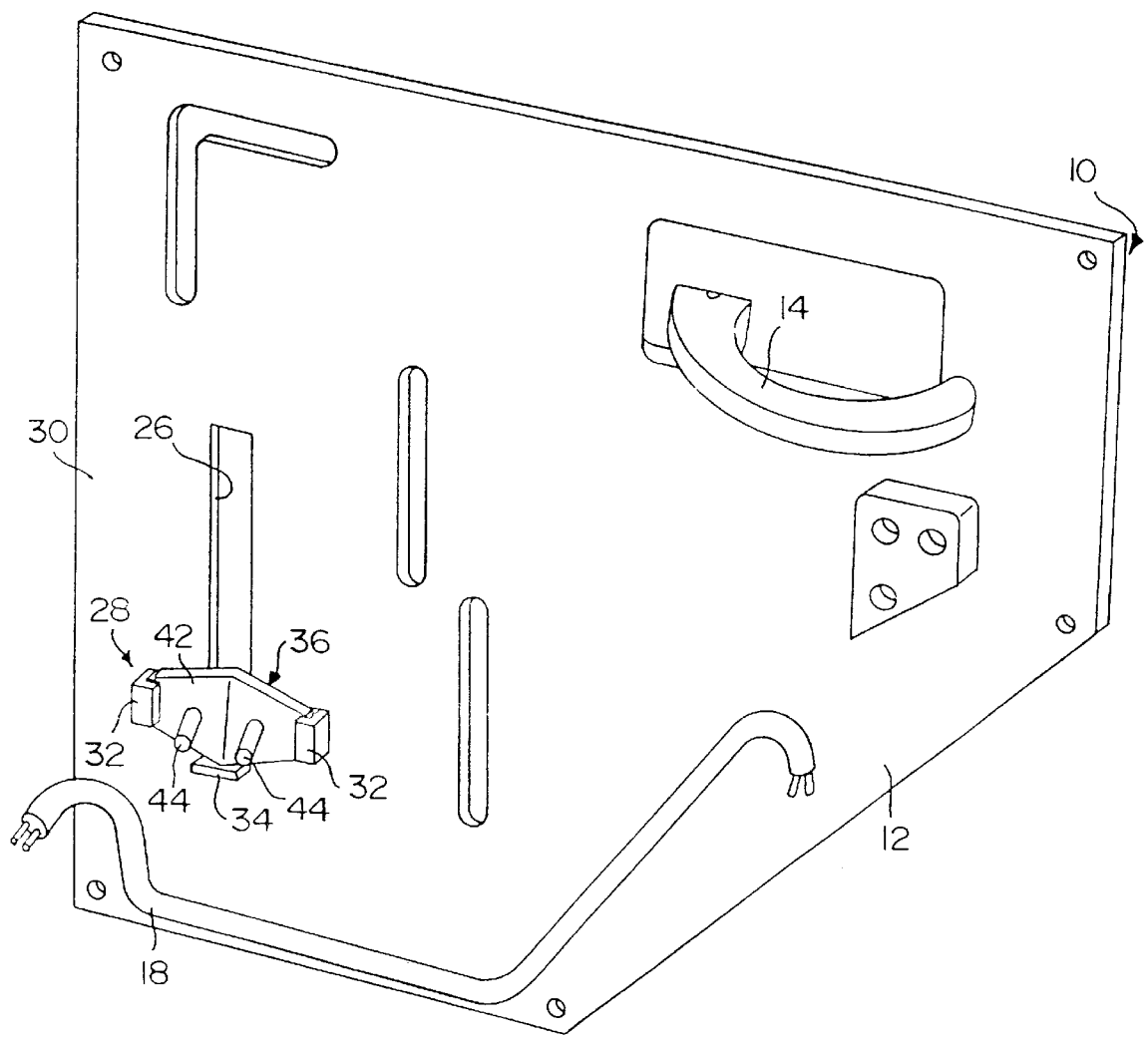
FIG. 3 is a perspective view of the door cartridge assembly shown in FIG. 2 viewed from the opposite side of the mounting plate with the window regulator component removed for clearer presentation.

The hardware mounting panel 12 is stamped so as to be provided with a vertical slot 26 extending through the panel, and a tab assembly, generally indicated at 28, extending outwardly from a front surface 30 of the mounting panel 12 and disposed generally towards the lower end of the vertical slot 26. The tab assembly 28 includes a pair of hook-shaped side tabs 32 disposed on opposite sides of the vertical slot 26, slightly spaced therefrom. The side tabs 32 have a substantially angular or concave surface facing in the direction of the vertical slot 26 and generally towards one another. The tab assembly 28 also includes a lower tab 34, which extends outwardly from the lower edge of slot 26 in generally the same direction as the side tabs 32. The lower tab 34 is preferably flat, in contrast with the angular or hook-shaped configuration of the side tabs 32. As shown in FIGS. 2 and 3, the tab assembly 28 functions to mount a door striker member, generally indicated at 36, and a door latch assembly, generally indicated at 38, to the mounting plate 12.

Figure 4:
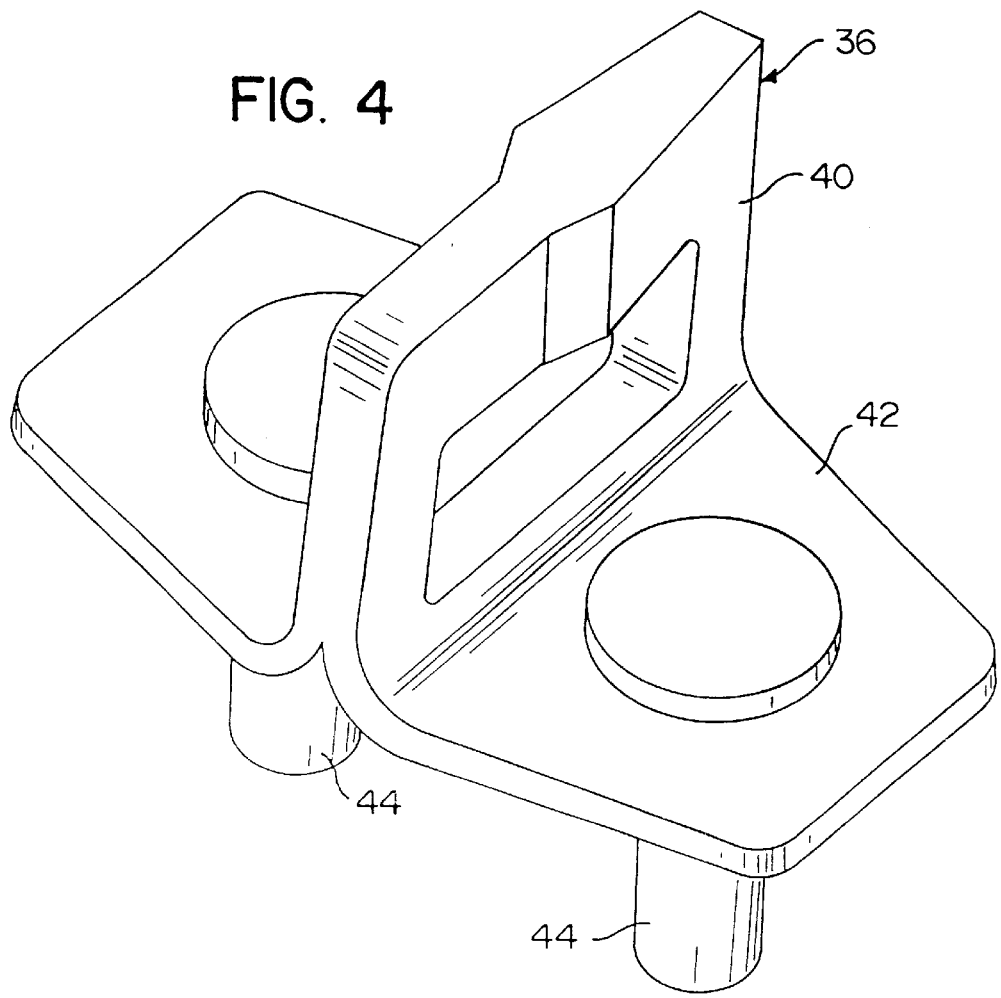
FIG. 4 is a perspective view of the striker member which forms a component of the present door cartridge assembly.

As best shown in FIG. 4, the door striker 36 is of any conventional type that is secured along the door opening or door frame, and which cooperates with the door latch assembly 38 for locking the vehicle door in the closed position. As shown, the door striker 36 has a catch portion 40 and a base portion 42. In the embodiment shown, a pair of fasteners 44 are fixed to the base portion 42 and extend therefrom for securing the striker 36 to the vehicle door opening frame. Alternatively, the base portion 42 can be apertured to receive conventional bolts (not shown).

Figure 5:
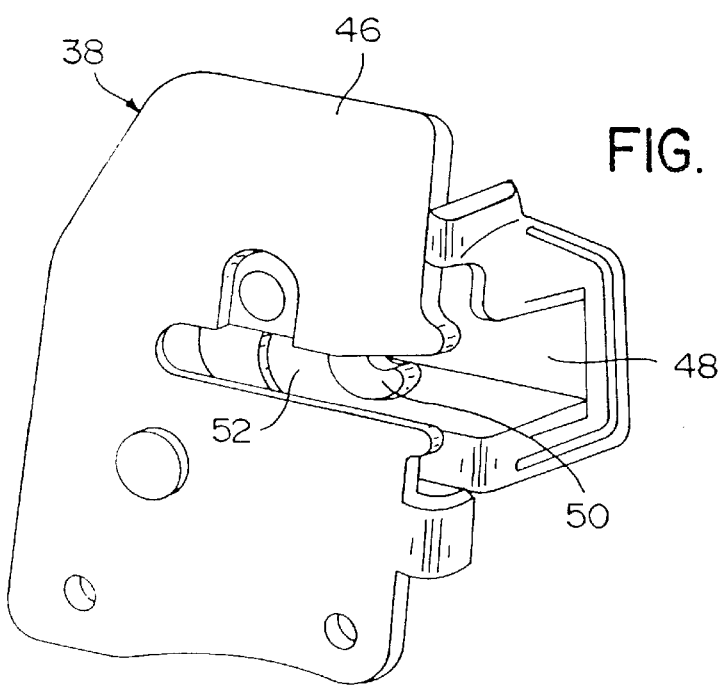
FIG. 5 is a perspective view of a door latch assembly forming a part of the door cartridge assembly.

The door latch assembly 38 is of any conventional type that is secured to the edge of a vehicle door for locking or latching the door in a closed position. As best shown in FIG. 5, the door latch assembly 38 has a main housing 46 defining a door catch receptacle 48, and a pivoted latching member 50. The door latching member 50 can be locked in position, as shown in FIGS. 3 and 5, by a releasable keeper (not shown). In the locking position, the door latching member 50 defines a catch locking area 52 within the inner portion of the door catch receptacle 48. It can be appreciated that the striker member 36 can be locked to the latch assembly 38 when the catch portion 40 is captured within the catch locking area 52 in conventional fashion.

FIG. 2 is a perspective view showing an opposite side 54 of the mounting plate 12 in contrast with the view shown in FIG. 1. The door latch assembly 38 and door striker 36 are mounted on the hardware mounting panel 12 for the purpose of shipping or transporting the door latch assembly 38 and the door striker 36 together with the mounting panel 12 from an assembly location to an installation location. As will now be described, the door latch assembly 38 and door striker 36 can be mounted on the hardware mounting panel 12 without the need for any additional fasteners or parts.

The vertical slot 26 is wide enough to receive the catch portion 40 of the striker 36 therethrough as shown. However, the base portion 42 is much too large to fit through the slot 26 and is left on the opposite side 54 of the mounting panel 12, as shown in FIG. 3. After the striker 36 is inserted through the panel 12, the door latch assembly 38 is manually forced onto the striker 36 so that the catch portion 40 is received within the receptacle 48, engages the latching member 50, and moves the latching member 50 into the locking position in conventional fashion, with the catch portion of the striker trapped within locking area 52. As a result, the latch assembly 38 and the striker 36 are effectively locked with the mounting plate 12, as shown in FIGS. 2 and 3. Thus, the catch portion of the striker defines coupling structure for coupling the door latch assembly 38 thereto.

Referring now to FIG. 3, the base portion 42 of the striker 36 is shown left behind on the first side 30 of the mounting plate 12. It can be appreciated that in order to mount the door striker 36 on the mounting panel 12, the catch portion 40 is inserted through the vertical slot 26 at the upper portion thereof, and the striker 36 is slid downwardly so that the side edges of base portion 42 are captured within the side tabs 32 and the bottom edge of base portion 42 comes to rest upon lower tab 34. Subsequently, the latch assembly 38 is latched to the striker 36 on the opposite side 54 of the door panel 12. Once transported to the assembly location, the latch assembly 38 is operable to move the latching member to a releasing position enabling the latch assembly 38 to be removed from engagement with the striker 36 and thus from the mounting panel 12, to be subsequently mounted on a vehicle door.

The tabs 32 and 34 function to hold the door striker 36 on the panel 12 while the door latch assembly 38 is being latched onto the catch portion 40 of the striker 36 so that it is not necessary to hold the striker in place, nor is it necessary to use two hands, when latching the latch assembly 38 onto the striker 36. Thus, the mounting of the latch assembly 38 and striker 36 onto the mounting plate 12 is greatly facilitated. In addition, because the striker 36 remains with the mounting plate 12 after the latch assembly 38 is removed, the latch assembly 38 can be installed into the vehicle, without the need to find a place for storing the striker 36 in the interim. When the striker 36 is to be installed, it is subsequently slid up the slot 26, against the force of gravity, and removed from the panel 12.

Figure 6:
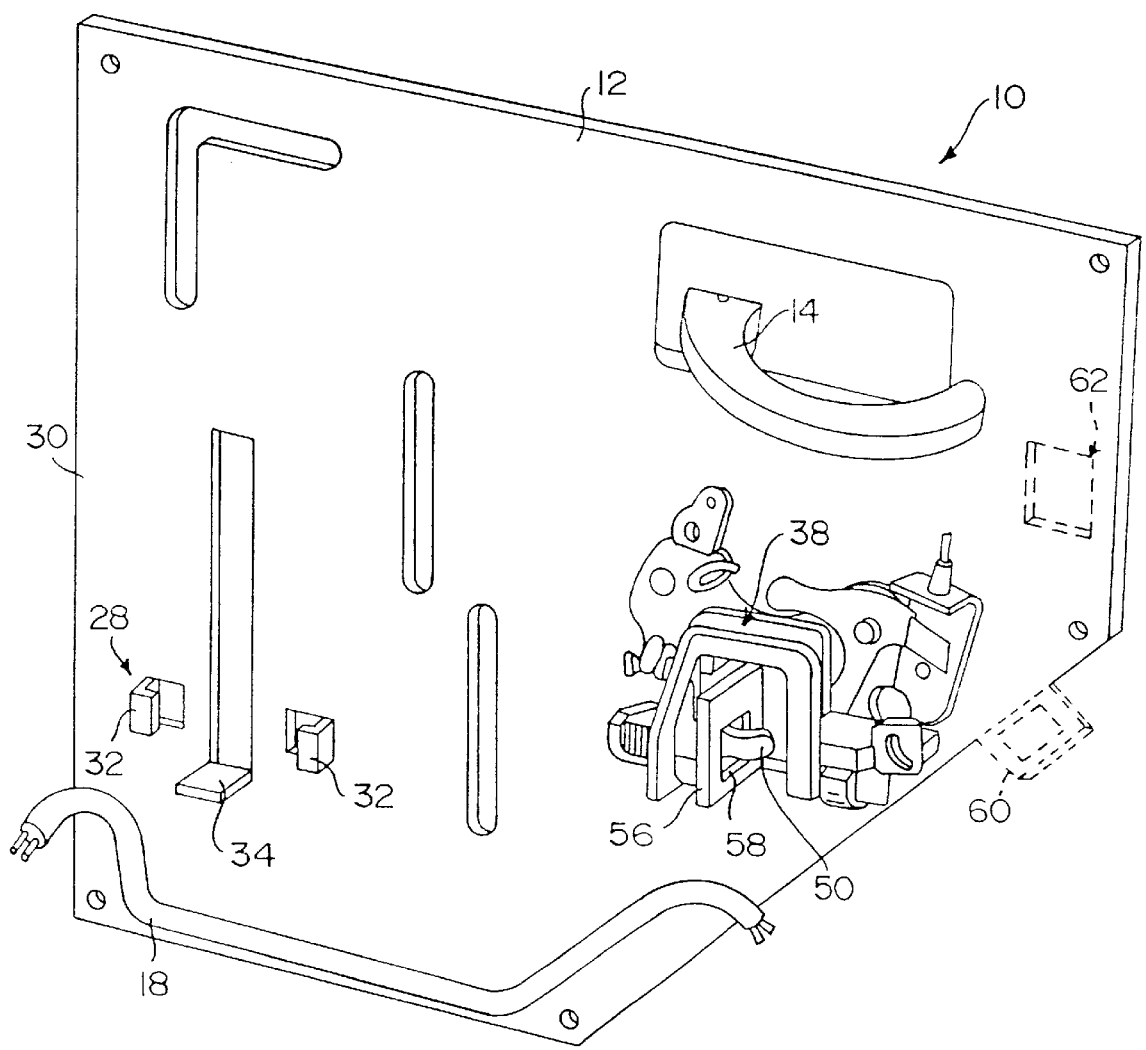
FIG. 6 is a perspective view of a modified door cartridge assembly embodying the principles of the present invention viewed from the side of the mounting plate shown in FIG. 2.

In another embodiment, as shown in FIG. 6, the mounting panel 12 is stamped so as to be provided with coupling structure in the form of a tab member 56 extending outwardly from the panel's front surface 30. Thus, in this embodiment, the coupling structure carried by the panel 12 is integral with the panel 12. The tab member 56 has an opening 58 formed therethrough defining a latch engaging portion. The tab member 56 provides the function of the striker 36 in that it enables the latch assembly 38 to be latched thereto, and further enables the latch assembly 38 to be shipped while being locked to the mounting plate 12. In this configuration, the striker 36 can either be shipped separately, mounted on the mounting panel via tabs 32 and 34 in similar fashion to the first embodiment. However, in the latter instance, the striker 36 would not be locked to the mounting panel unless other provisions are made as, for example, a fastener or the like.

It should be noted that the configuration or location for the coupling structure or tab member 56 is not essential. For example, it can be provided along the periphery of the mounting panel 12, as indicated in the dashed-line configuration indicated at 60. Alternatively, where no protruding tab member 56 is provided, the catch portion to which the latch assembly 22 is latched forms a portion of the periphery of the mounting panel 12, as indicated in the dashed-line configuration indicated at 62. These latter two configurations are advantageous over the tab member 56 in that they only require a hole-punch stamping operation, and do not require an additional bending operation for bending a tab member outwardly from the panel, as is the case with the outwardly projecting tab member 56.

Figure 7:
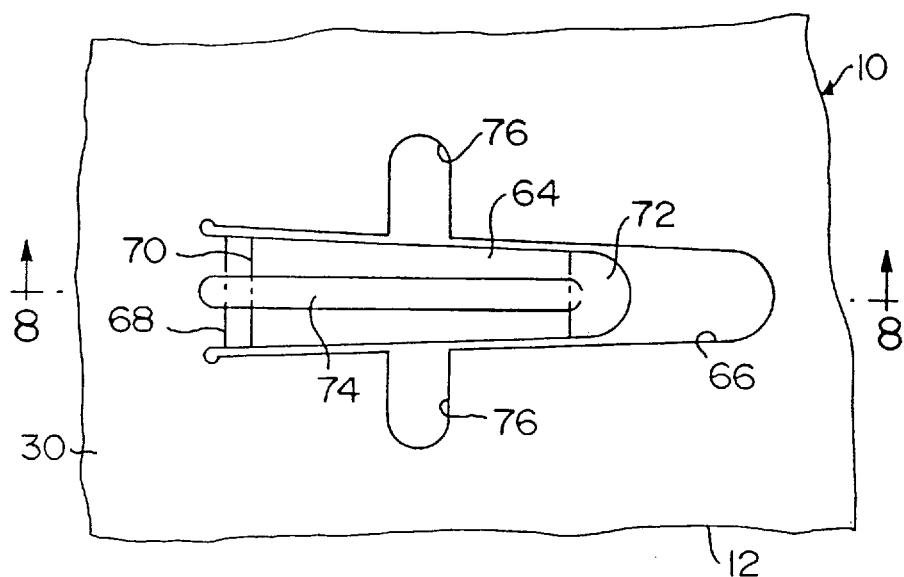
FIG. 7 is a fragmentary top plan view showing another tab arrangement for holding the striker of FIG. 4.

FIG. 7, shows another tab arrangement which may be utilized in lieu of the tab assembly 28 previously described. As shown, a tab 64 in an elongated slightly tapered rectangle shape is struck from the mounting plate 12 so as to form a opening 66. The tab 64 is bent as indicated at 68 at its junction with the plate 12 in a direction away from the surface 30 and is bent again as indicated at 70, in an opposite direction a short distance thereafter. A free end 72 of the tab is bent upwardly as shown. Extending from opposite sides of the mid-portion of the opening 66 is a pair of slots or elongated openings 76. A reinforcing rib 74 is preferably formed in the tab 64 along the central longitudinal axis thereof.

Figure 8:
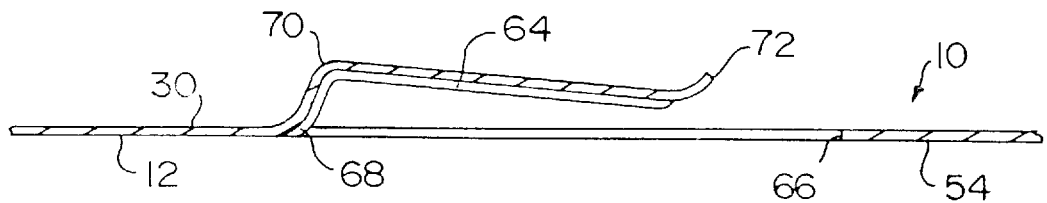
FIG. 8 is a sectional view taken along the line 8—8 of FIG. 7.

The tab arrangement is shown in FIGS. 7 and 8 are adapted to receive a striker 36 of a type shown in FIG. 4 in which the fasteners 44 are not provided but instead openings for conventional fasteners are provided. In order to mount the striker 36 without the fixed bolts 44, the portion 40 is hooked under the upwardly extended free end 72 of the tab 64 and the entire striker 36 is moved so that the tab 64 enters the opening in the portion 40. As soon as the portion 40 reaches the area where the slots 76 are provided, the entire portion 40 is moved through the slots 76 so that it can extend beyond the other side 54 of the plate 12. With the striker 36 in this position, the latch assembly 38 can be engaged to the striker 36 in the manner previously described.

Figure 9:
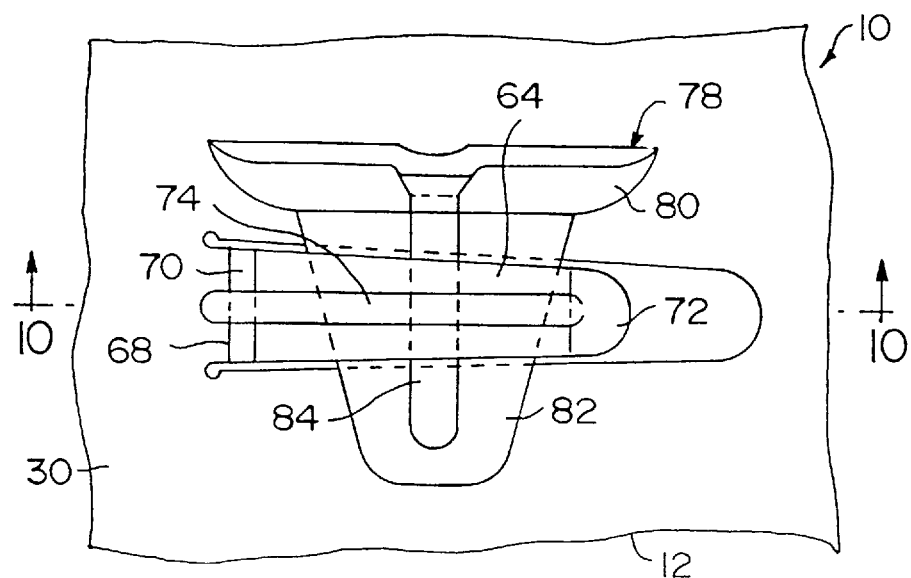
FIG. 9 is a view similar to FIG. 7 showing a modification of the tab arrangement of FIG. 7 to accommodate a different striker in cooperating relation to the tab.
Figure 10:
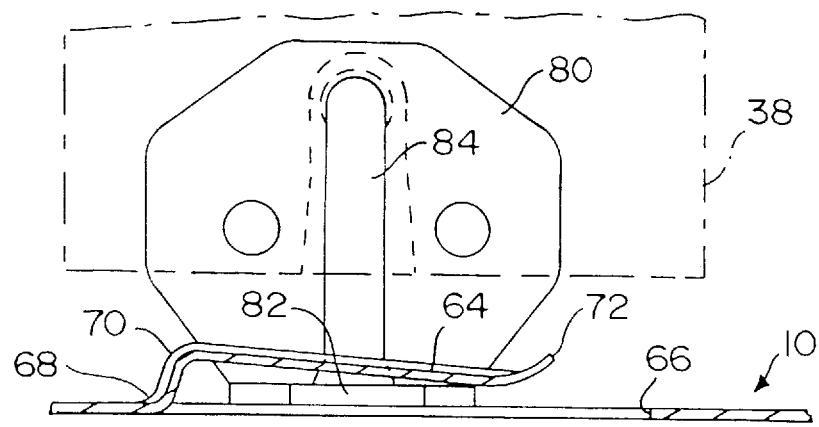
FIG. 10 is a sectional view taken along the line 10—10 of FIG. 9 with the tab and striker shown in elevation.

FIGS. 9 and 10 illustrate a variation of the tab arrangement shown in FIGS. 7 and 8 for accommodating another striker construction. The tab 64 is the same except that there is no need to provide the slots 76. The tab 64 is arranged to received a striker 78 which includes a base portion 80, suitably apertured to receive mounting bolts and having an upstanding integral flange portion 82. Extending from the base portion to the upper portion 80 of the integral flange 82 is an L-shaped keeper bar 84. The striker 78 is mounted on the mounting plates 12 by inserting the flange beneath the end of the tab and sliding it so that the tab enters the opening provided by the L-shaped keeper bar 84. FIG. 10 illustrates in dotted lines how the latch element can then be interengaged with the striker 76.

The cartridge assembly 10 is best used in the shipment of latch and striker components for cable activated inside release mechanisms, but, it is within the contemplation of the invention to coupled rod activated mechanisms to the panel to be shipped therewith.

It can be appreciated that the door cartridge assembly of the invention provides a convenient, temporary attachment of the door latch assembly and striker to the door mounting panel for shipping purposes. Once transported to the assembly location, the latch assembly can be unlatched from the panel and the striker and latch assembly can be fixed to a vehicle door.

While the invention has been described in connection with what is presently considered to be the most practical and preferred embodiment, it is understood that the invention is not limited to the disclosed embodiment but, on the contrary, is intended to include various modifications and equivalent arrangements included within the spirit and scope of the appended claims.

What is claimed is:

1. A door cartridge assembly to be installed into a vehicle door, comprising:
   a door hardware mounting panel having door components mounted thereon and being constructed and arranged to be fixedly mounted to a vehicle door,
   coupling structure carried by said mounting panel, and
   a door latch assembly constructed and arranged to be secured to a vehicle door to provide a latch for the vehicle door, said door latch assembly including a latching member constructed and arranged to be movable between a latching position and a releasing position,
   said coupling structure being constructed and arranged to receive said latching member in latching relation therewith when said latching member is in said latching position thereof, thereby permitting said mounting panel to be transported with said door latch assembly connected thereto,
   said door latch assembly being operable to move said latch member from said latching position to said releasing position permitting said latch assembly to be removed from latching relation with said coupling structure and to be subsequently secured to the vehicle door.

2. The door cartridge assembly according to claim 1, wherein said coupling structure includes a tab member extending outwardly from a surface of said panel, said tab member including an opening therein for receiving said latching member of said latch assembly.

3. The door cartridge assembly according to claim 1, wherein said coupling structure includes a tab member extending outwardly from a peripheral edge of said panel, said tab member including an opening therein for receiving said latching member of said latch assembly.

4. The door cartridge assembly according to claim 1, wherein said coupling structure includes surfaces defining a hole through said panel near a peripheral edge thereof for receiving said latching member of said latch assembly.

5. The door cartridge assembly according to claim 1, wherein said panel includes a front surface and a rear surface and a slot extending therethrough from said front surface to said rear surface, and a tab assembly disposed on said front surface generally adjacent one end of said slot, said slot receiving a catch portion of a door striker, said catch portion extending from a base portion of said striker and defining said coupling structure, said base portion being received by said tab assembly generally adjacent said front surface of said panel and said latch assembly being in latching relation with said catch portion generally adjacent the rear surface of said panel thereby connecting said latch assembly and striker with respect to said panel.

6. The door cartridge assembly according to claim 5, wherein said tab assembly includes a pair of hooked-shaped side tabs extending outwardly from said front surface of said panel and disposed on opposite sides of said slot, and a lower tab extending outwardly adjacent said one end of said slot, said side tabs and said lower tab including surfaces constructed and arranged to engage said base portion of said striker when said striker is connected to said panel, said tab assembly and said slot being constructed and arranged to permit said striker to be moved in a direction away from said one end of said slot after said latch assembly is removed from latching relation therewith, enabling said striker to be removed from said panel and subsequently assembled to the vehicle door.

7. The door cartridge assembly according to claim 1, wherein said panel includes a front surface and a rear surface and a slot extending therethrough from said front surface to said rear surface, and a tab member connected to and spaced from said front surface and disposed generally transverse to said slot, said slot receiving a catch portion of a door striker, said catch portion extending from a base portion of said striker and defining said coupling structure, said base portion being engaged by said tab member adjacent said front surface of said panel and said latch assembly being in latching relation with said catch portion generally adjacent the rear surface of said panel connecting said latch assembly and striker with respect to said panel.

8. The door cartridge assembly according to claim 7, wherein said tab member is elongated and formed from the mounting panel, said tab member being bent at its junction with the panel in a direction away from said front surface of said panel such that said tab member is spaced from said front surface.

9. The door cartridge assembly according to claim 1, wherein said panel includes a tab member connected to and spaced from a surface said panel, a portion of a door striker being engaged by said tab member adjacent said surface of said panel and said latch assembly being in latching relation with another portion of said striker, said another portion defining said coupling structure.

10. The door cartridge assembly according to claim 1, wherein said door components include at least a release handle, a window regulator and a wiring harness.

11. The door cartridge assembly according to claim 1, wherein said mounting panel is a steel stamping.

12. A door cartridge assembly to be installed into a vehicle door, comprising:

a door hardware mounting panel having door components mounted thereon and being constructed and arranged to be fixedly mounted to a vehicle door, said panel having a front surface and a rear surface with a slot extending therethrough from said front surface to said rear surface, a striker including a base portion and a catch portion extending from said base portion, said catch portion being received in said slot so as to be disposed generally adjacent said rear surface of said panel with said base portion being disposed generally adjacent said front surface of said panel, a door latch assembly constructed and arranged to be secured to a vehicle door to provide a latch for the vehicle door, said door latch assembly including a latching member constructed and arranged to be movable between a latching position and a releasing position, said catch portion of said striker being constructed and arranged to receive said latching member in latching relation therewith when said latching member is in said latching position thereof, thereby permitting said mounting panel to be transported with said door latch assembly and said striker connected thereto, said door latch assembly being operable to move said latch member from said latching position to said releasing position permitting said latch assembly to be removed from latching relation with said catch portion enabling said door latch assembly and said striker to be removed from said panel to be subsequently secured to a vehicle door.

13. The door cartridge assembly according to claim 12, further comprising a tab assembly, said tab assembly including a pair of hooked-shaped side tabs extending outwardly from said front surface of said panel and disposed on opposite sides of said slot, and a lower tab extending outwardly from said one end of said slot, said side tabs and said lower tab including surfaces constructed and arranged to engage said base portion of said striker when said striker is connected to said panel, said tab assembly and said slot being constructed and arranged to permit said striker to be moved in a direction away from said one end of said slot after said door latch assembly is removed from latching relation therewith, enabling said striker to be removed from said panel and subsequently assembled to the vehicle door.

\* \* \* \* \*